United States Patent [19]
Chadima, Jr.

[11] 3,991,300
[45] Nov. 9, 1976

[54] BAR CODE LABEL
[75] Inventor: George E. Chadima, Jr., Cedar Rapids, Iowa
[73] Assignee: Norand Corporation, Cedar Rapids, Iowa
[22] Filed: Feb. 3, 1972
[21] Appl. No.: 223,072

[52] U.S. Cl. .......................................... 235/61.12 N
[51] Int. Cl.² ............................................. G06K 19/06
[58] Field of Search ............. 235/61.12 R, 61.12 N, 235/61.12 M, 61.11 E; 240/146.32

[56] References Cited
UNITED STATES PATENTS

| | | | |
|---|---|---|---|
| 3,044,696 | 7/1962 | Feissel | 235/61.12 R |
| 3,359,405 | 12/1967 | Sundblad | 235/61.12 R |
| 3,543,007 | 11/1970 | Brinker et al. | 235/61.11 E |
| 3,585,367 | 6/1971 | Humbarger | 235/61.11 E |
| 3,636,317 | 1/1972 | Torrey | 235/61.11 E |
| 3,671,722 | 6/1972 | Christie | 235/61.12 N |

FOREIGN PATENTS OR APPLICATIONS
1,214,849  12/1970  United Kingdom .......... 235/61.12 N

*Primary Examiner*—Daryl W. Cook
*Attorney, Agent, or Firm*—Hill, Gross, Simpson, Van Santen, Steadman, Chiara & Simpson

[57] ABSTRACT

A bar code label having a series of bars of two different widths, namely a narrow bar and a wide bar. The bars may be formed in black and white to be read by an optical scanner of the type described in my Copending Application entitled, "Bar Code Scanner" filed on even date herewith. The bars are allocated to equal width "slots" and are given a binary weight according to a standard hexadecimal code. The black and white bars may be used interchangeably to represent the same logic state. Accordingly, the logic information is obtained only as a result of the detection of wide and narrow bars.

5 Claims, 4 Drawing Figures

STANDARD CODE
(POSITIVE OPTICS)

BAR CODE LABEL

BACKGROUND OF THE INVENTION

1. Description of the Prior Art

Bar code labels are known in the prior art which use a plurality of different widths or which use different colors to represent the required data. Such systems usually require more space for a given quantity of data and usually require some sort of separating means between characters. Such systems are also more difficult to print. The present invention uses a code of only two widths, and only two colors.

2. Field of the Invention

The field of art to which this invention pertains is labels for bar codes and in particular to labels having bars of only two widths and two colors or two polarities to represent the coded data.

SUMMARY OF THE INVENTION

It is an important feature of the present invention to provide an improved bar code label.

It is another feature of the present invention to provide a bar code label having bars of only two different widths.

It is a principal object of the present invention to provide a label having a series of black and white bars of two widths only.

It is a further object of the present invention to provide a label having a bar code as described above wherein a pair of narrow bars are provided on the label each time a first binary logic state is indicated and wherein a wide bar is provided each time a second binary logic state is indicated.

It is an additional object of the present invention to provide a label having a bar code as described above, wherein the polarities of the code are usable interchangeably to represent the same logic state.

It is also an object of the present invention to provide a bar code label as described above wherein the narrow width bars are approximately one half the width of the wide bars.

It is another object of the present invention to provide a label having a bar code as described above wherein equal width slots are allocated on the label and the slots are filled either by a wide bar or by a pair of narrow bars of opposite polarities to each other.

These and other objects, features and advantages of the present invention will be understood in greater detail from the following description wherein reference numerals are utilized to designate a preferred embodiment.

DESCRIPTION OF THE PREFERRED EMBODIMENT

Figure 1:
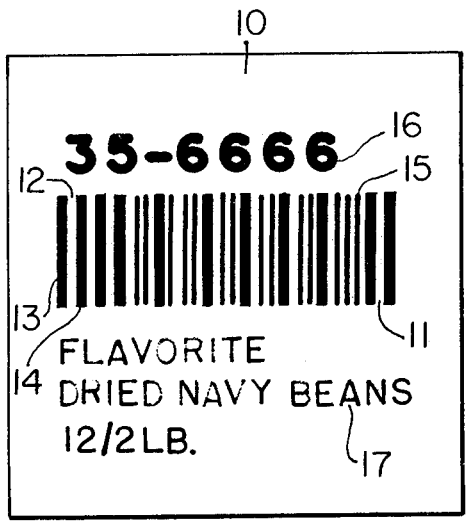
FIG. 1 is an illustration showing an enlarged label according to the present invention, having the bar code described above disposed thereon for being read by an electronic scanning device.

The present invention relates to a label having a bar code which may be automatically read by an electronic scanning device. The label is of a type which may be used to represent a product in a supermarket and either may be used for ordering purposes or it may be used for an automatic check out system. The label may have the bars formed thereon either by using different color inks for optic scanning or may be magnetically responsive bars. My Co-pending application entitled, "Bar Code Scanner" filed of even date herewith discloses an optical scanning device for reading a bar code of the type described herein. The term "bar" as used herein refers either to a straight bar of the type shown in the drawings or a bar which is curved and which is any part, or the whole of a circle. The term "bar" as used herein is not in any way limited to a rectangular configuration.

Bar codes are known in the prior art, some of which have various widths which are multi-colored in order to designate the required binary information. The present invention, however, is directed to a label having a code formed from bars of only two widths and only two colors. In the preferred embodiment, the wide bar is twice the width of the narrow bar and the colors are black and white.

According to the present invention, the label may have a given arrangement of the bar code or may have its complement to represent the same hexadecimal code. By "complement" is meant the negative image where a white bar for instance is used in place of a black bar. Hence, the label of the present invention is not dependent upon whether the negative or positive image of a code is used. This is an important feature since this means that there is no need to provide separation or "dead" space between characters. If a given character is represented by a given sequence of bars which *ends* in a black bar, and the next character sequence *begins* with a black bar, the negative of the sequence of bars of the second character may be used to avoid the black bar at the end of the first character coinciding with the black bar at the beginning of the second character. In this way, the label of the present invention may be smaller in size and yet contain the same number of characters as a much larger prior art label.

Referring to the drawings in greater detail, FIG. 1 shows a label 10 according to the present invention. The label 10 has a series of bars formed thereon which may be either white bars 11 and 12 or black bars 13 and 14. The bars may also be wide bars such as the bars 13 and 14 or narrow bars such as a bar 15. The numeric data represented by the series of bars is shown at 16. This data may represent the code for an item on a grocery store shelf such as shown at 17. The bar code information may be automatically read by a scanning device 18 as described in my Co-pending Application entitled, "Bar Code Scanner" filed of even date herewith.

Figure 2:
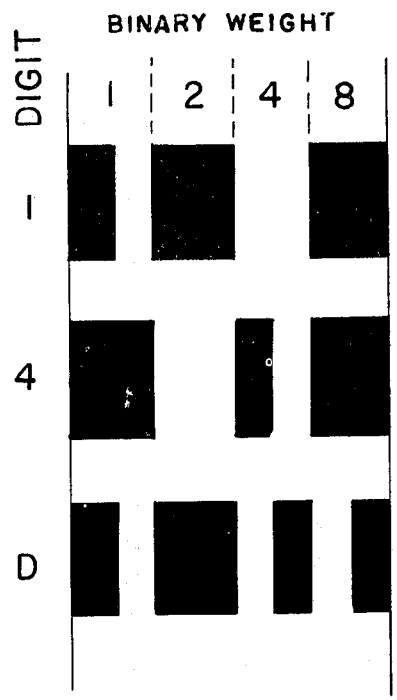
FIG. 2 is a chart showing the way in which the bar code is developed and also illustrating the use of the wide and narrow bars to represent the binary information indicative of alpha-numeric data.

FIG. 2 shows the arrangement of the various bars that are used on a label of the present invention. In the arrangement shown in FIG. 2, a wide bar is arbitrarily designated as a logic 0 and a narrow bar is designated as a logic 1. Hence, reading from left to right in the first row, the digit 1 is represented by the logic states 1-0-0-0.

In the second row, the numeral 4 is indicated by the logic states 0-0-1-0. In this case, the second logic state is indicated by a wide white bar which means logic 0 and a logic 0 is also given to the wide black bar in the first logic state.

Finally in the third line, the letter D is represented by the logic states 1-0-1-1. It is easy to see that if the black bars and white bars were interchanged, the same binary weight would be attributed to each line in FIG. 2. This is illustrated further in FIG. 3.

Figure 3:
FIG. 3 shows the complement of a portion of the chart of FIG. 2 illustrating the interchangeable feature of the polarities of the bar code.

FIG. 3 shows the complement of the second line of FIG. 2. In FIG. 3, the logic states are read 0-0-1-0 which is identical to that in FIG. 2, even though FIG. 3 is the negative image of the corresponding line of FIG. 2.

It is not necessary, of course, that the wide bar be given a logic 0 state. This selection is arbitrary, and the wide bar could as well have been given a logic 1 state with a narrow bar being associated with the logic 0 state. This would, of course, result in a different code than that indicated in FIG. 2. For instance, if the state of the wide and narrow bars were interchanged, then the first line in FIG. 2 would represent the letter E, the second line would represent the letter B, and the third line would represent the numeral 2.

Figure 4:
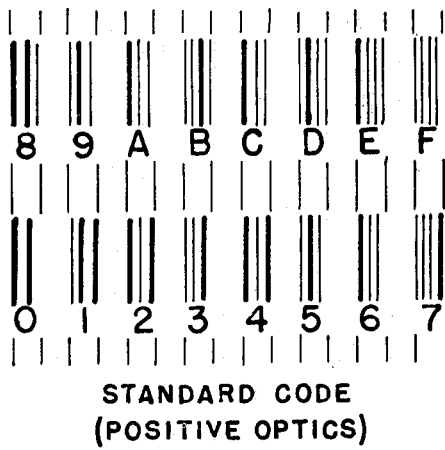
FIG. 4 illustrates the use of the bar code of the present invention in a standard code format so as to be adaptable to form alphabet and control code characters standardized in the industry.

FIG. 4 shows a standard code arrangement corresponding to the logic designations illustrated in FIG. 2. The standard code arrangement shown in FIG. 4 is chosen in such a way that any two digits of FIG. 4 may be combined to form the alphabet and control code characters used in the industry such as are specified by the American Standard Code for Information Interchange, (ASCII) or the Extended Binary Coded Decimal Interchange Code (EBCDIC).

Therefore, according to the present invention a label is provided which is unique in that it permits more data per square inch, and which requires no separation between characters. The label is easily printed because it requires only two widths rather than multi-width bars and does not require multi-color printing.

What I claim is:

1. A bar code label having a surface thereof divided into equal width portions, each such equal width portion having a plurality of bars representing an alphanumeric character, said bars being of contrasting polarities and being of two different widths, said label having a sequence of such equal width characters progressing from left to right thereon.

2. A bar code label in accordance with claim 1 wherein each narrow bar thereon is accompanied by an adjacent narrow bar of the opposite polarity.

3. A bar code label in accordance with claim 1 wherein said bars are interchangeably used with like width bars of the opposite polarity.

4. A label in accordance with claim 1 wherein said narrow bars are approximately ½ the width of said wide bars.

5. A bar code label in accordance with claim 4 wherein said bars are formed by black printing on a white background and wherein opposite polarity bars are provided by the white background between the black bars.

* * * * *